US009052024B2

(12) United States Patent
Bertakis et al.

(10) Patent No.: US 9,052,024 B2
(45) Date of Patent: Jun. 9, 2015

(54) NON-INTRUSIVE, LOW CHATTER PRESSURE RELIEF VALVE SYSTEM

(75) Inventors: Bill Bertakis, Keego Harbor, MI (US); Jan Pitzer, Brighton, MI (US); Mike Thomas, Dundas (CA); Dale Wesener, Chesaning, MI (US); Mike Wallace, Wayne, MI (US)

(73) Assignee: FINISHING BRANDS HOLDINGS INC., Minneapolis, MN (US)

( * ) Notice: Subject to any disclaimer, the term of this patent is extended or adjusted under 35 U.S.C. 154(b) by 765 days.

(21) Appl. No.: 12/907,501

(22) Filed: Oct. 19, 2010
(Under 37 CFR 1.47)

(65) Prior Publication Data
US 2011/0283939 A1 Nov. 24, 2011

Related U.S. Application Data

(60) Provisional application No. 61/261,793, filed on Nov. 17, 2009.

(51) Int. Cl.
*B05B 9/00* (2006.01)
*F16K 17/04* (2006.01)

(52) U.S. Cl.
CPC .................. *F16K 17/0433* (2013.01)

(58) Field of Classification Search
CPC .................................................. F16K 17/0433
USPC .......... 137/496, 542, 469, 475, 476; 222/318; 239/124
See application file for complete search history.

(56) References Cited

U.S. PATENT DOCUMENTS

| 2,590,656 | A | * | 3/1952 | Schnebel | 137/536 |
| 3,025,869 | A | | 3/1962 | Kenfield | |
| 3,474,816 | A | * | 10/1969 | Burgess | 137/238 |
| 3,618,690 | A | | 11/1971 | Johnson | |
| 4,564,338 | A | | 1/1986 | Ilg | |
| 4,566,486 | A | * | 1/1986 | Taylor et al. | 137/469 |
| 4,705,065 | A | | 11/1987 | McNeely et al. | |

(Continued)

FOREIGN PATENT DOCUMENTS

FR    1 384 817    1/1965

OTHER PUBLICATIONS

International Search Report of PCT/US2010/056533, Mailed Feb. 25, 2011, 5 pages.

*Primary Examiner* — Len Tran
*Assistant Examiner* — Joel Zhou
(74) *Attorney, Agent, or Firm* — Brinks Gilson & Lione (57) ABSTRACT

A pressure relief system and a non-intrusive, low chatter pressure relief valve for use with such as system are disclosed. The pressure relief valve allows excess pressure in a pressurized fluid line to flow through a flow return line to a fluid reservoir when the fluid pressure exceeds the valve's pressure limit setting. The establishment of a uniform channel between the valve stem and the inner surface of a housing in which the valve stem is slidably located, as well as the use of a vent and sight tube to remove air from the top portion of the housing upon a spring being compressed during the opening of the valve, reduces the occurrence of pulsation and vibration when the valve is cycled between its open and closed positions. When the valve is in its closed position, the bottom end of the valve stem is in close proximity to the inner surface of the main fluid passageway in the pressurized fluid line, but does not intrusively interfere with the flow of fluid through the main fluid passageway.

11 Claims, 6 Drawing Sheets

(56) References Cited

U.S. PATENT DOCUMENTS

| | | |
|---|---|---|
| 4,708,164 A | 11/1987 | Scallan |
| 4,859,155 A | 8/1989 | Laqua |
| 4,932,434 A | 6/1990 | Taylor |
| 5,002,088 A | 3/1991 | Engelhardt et al. |
| 5,515,884 A | 5/1996 | Danzy et al. |
| 5,623,962 A * | 4/1997 | Danzy et al. .................. 137/469 |
| 5,921,274 A | 7/1999 | Schuller et al. |
| 5,984,148 A | 11/1999 | Andel et al. |
| 6,095,183 A | 8/2000 | Taylor et al. |
| 6,161,571 A | 12/2000 | Taylor |
| 6,189,562 B1 | 2/2001 | Lorentz |
| 6,363,960 B1 | 4/2002 | Gauss |
| 6,681,418 B1 * | 1/2004 | Bierend et al. ..................... 4/661 |
| 7,337,796 B2 * | 3/2008 | Choate et al. .............. 137/15.19 |
| 2005/0152789 A1 | 7/2005 | Kapron |

\* cited by examiner

NON-INTRUSIVE, LOW CHATTER PRESSURE RELIEF VALVE SYSTEM

CROSS REFERENCE TO RELATED APPLICATION

This application claims priority to U.S. Provisional Patent Application No. 61/261,793 filed Nov. 17, 2009, which is incorporated herein by reference in its entirety.

FIELD OF APPLICATION

This disclosure relates generally to a non-intrusive, safety pressure relief system for use in a pressurized pipeline, such as that used in a paint circulation and/or application system. More specifically, the present disclosure discloses a pressure relief valve that can be used to provide secondary internal relief for a pressurized fluid line by limiting the pressure exerted by a fluid pumped through a pipeline to a predetermined set point.

BACKGROUND

Pressure relief or bypass valves conventionally include an adjustable or non-adjustable spring-loaded valve in which a plug is seated over an internal orifice leading to a pressurized fluid line, such as that used in a paint circulation and/or application system. The spring is used to bias the plug into a seated or closed position when the pressure in the pressurized fluid line is below the resistance exerted by the spring. When the pressure inside the system reaches a level sufficiently high enough to overcome the resistance of the spring, the plug is lifted off of the orifice allowing pressurized fluid to flow past the valve and through the orifice. Unfortunately, the simplicity of this type of system also comes with several inherent deficiencies or issues. Each of these issues manifests itself in one way or another in the pressure relief valves that are currently available.

First, existing pressure relief valves tend to open and shut frequently producing what one skilled-in-the-art will describe as "chatter" or a "water hammer" effect. This phenomenon arises when the valve is forced to rapidly cycle between its open and closed positions. More specifically, if the pressurized fluid line becomes partially constricted or blocked or the pump is adjusted to increase flow, the pressure in the pressurized fluid line will increase. At some point, this increase in pressure in the pressurized fluid line will equal and/or surpass the resistance of the spring in the pressure relief valve. Once the pressure set point has been exceeded (e.g., resistance of the spring is overcome), the seal between the valve plug and the valve seat is broken and the valve opens, thereby permitting flow through the valve. Once a small amount of liquid passes through the orifice and into the valve, the excess pressure in the pressurized fluid line is relieved and the magnitude of the pressure in the line decreases. If the pressure in the pressurized fluid line falls below the pressure set point of the valve, the valve will quickly close. However, if the cause of the initial pressure increase in the fluid line has not been remedied, then the pressure will quickly build up again to a level above the valve's pressure set point and the valve will reopen. This cycling of the valve between open and closed positions can continue to occur over and over again. When this happens, the continual opening and closing of the valve can result in undesirable chatter or water hammer sounds, as well as the occurrence of a significant amount of vibration.

Second, conventional pressure relief valves used in a paint circulation and/or application system are often off-set from the pressurized fluid line or located a short distance from the main fluid flow. This is typically accomplished by connecting the valve to the pressurized fluid line through the use of a pipe or tube that is about 0.5-5.0" in length. When the valve is closed, fluid is initially forced by the pressure in the pressurized fluid line to flow into the connecting tube. Once this fluid enters the connecting tube, it is no longer subject to the same flow conditions as that established in the main fluid circulating line. Thus the fluid in this connecting tube may over time become stagnant and begin to phase separate (e.g., separation between liquid phases or between solid/liquid phases). Phase separation in the fluid may lead to the agglomeration and sedimentation of any solids present (e.g., pigments, additives, etc.) in the fluid. The presence of sedimentation in the connecting tube may plug the tube, thereby preventing the valve from operating properly or when the valve does operate, the sediment may damage the valve's internal components, thereby requiring the valve to be replaced.

In addition, if any sediment in the connecting tube gets disturbed, it can reenter the pressurized fluid line, flow downstream, and ultimately cause additional issues. For example, agglomerated pigment particles that make their way into the paint applied to a manufactured part are known to one skilled-in-the-art to be a root cause of visible point defects in the final paint finish. The occurrence of such defects will ultimately result in an increased amount of scrap and higher production costs. The conventional method of addressing this issue through the periodic removal and cleaning of the pressure relief valve and connecting tube also leads to higher manufacturing costs and losses in productivity.

Accordingly, there exists a continual need or desire for the development and availability of improved pressure relief valve systems for pumps and pressurized fluid circulation systems that provide pressure relief when the pressure set point is exceeded and that do not chatter, vibrate, or produce a water hammer noise. The desire also exists in the industry that such improved pressure relief valve systems will minimize the occurrence of sedimentation and reduce the need to periodically inspect, remove, and clean the components that comprise the system.

SUMMARY

The present disclosure provides a pressure relief system and a mechanical pressure relief valve for use in such a system. The pressure relief valve and system are used to relieve pressure in a fluid circulation system that has fluid flowing through a pressurized line. The pressure relief valve includes a pressure limit set by the resistance provided by a spring included in the top section of the valve. The valve is closed when the pressure in the fluid circulation system is below this set point. However when the pressure in the fluid circulation system reaches or surpasses the pressure limit, the valve opens and allows fluid to pass through the bottom section of the valve and out a side section to an overflow tube connected to a fluid reservoir.

In one embodiment, the pressure relief valve constructed in accordance with the teachings of the present disclosure, generally enhances the cleanliness and reduces the level of pulsation and vibration exhibited by the valve during its use. The establishment of a uniform channel between the valve stem and the inner surface of the housing in which the valve stem is slidably located, as well as the use of vent & sight tube to remove air from the top portion of the housing upon the spring being compressed during the opening of the valve, reduces the occurrence of pulsation and vibration when the valve is cycled between its open and closed positions.

According to another aspect of the present disclosure, when the valve is in its closed position, the bottom end of the valve stem is in close proximity to the inner surface of the main fluid passageway in the pressurized fluid line. However, the bottom end of the valve stem does not intrusively interfere with the flow of fluid through the main fluid passageway. Rather having the bottom end of the valve stem reside within close proximity to the interior surface of the pressurized paint line enhances the cleanliness of the valve by eliminating the conventional use of a short tube or pipe that is known to induce stagnation of the fluid, particle/additive agglomeration, and the occurrence of sedimentation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the description and drawings, corresponding reference numerals indicate like or corresponding parts and features.

Figure 1:
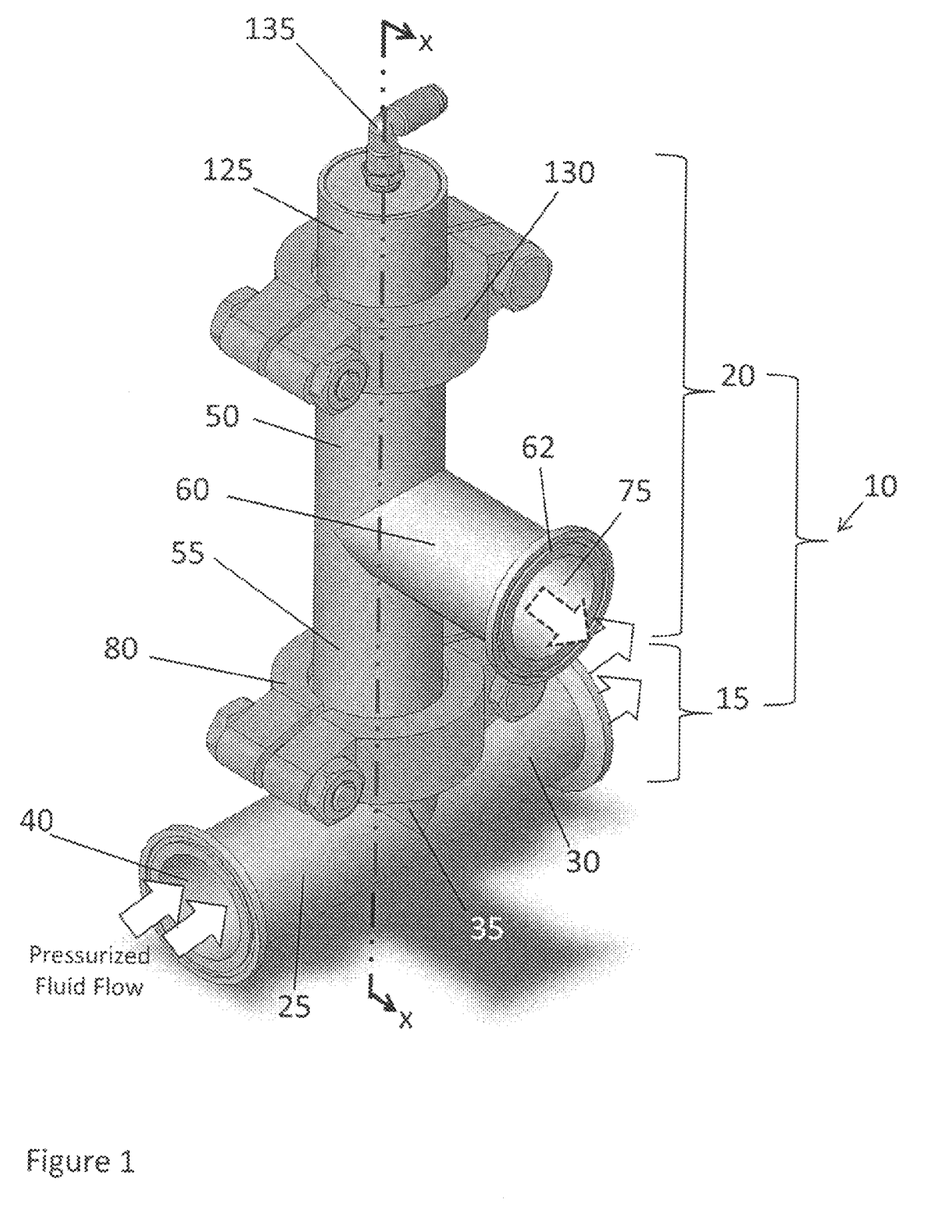
FIG. 1 is a perspective view of a safety pressure relief system including a non-intrusive mechanical pressure relief valve constructed according to the teachings of the present disclosure.

The present disclosure generally provides a mechanical pressure relief system that includes a mechanical pressure relief valve, which has little affect on the flow of fluid through a pressurized fluid line, except to allow a portion of the fluid flowing through the pressurized line to flow back to a fluid reservoir through an overflow line when the fluid pressure in the pressurized line exceeds a set pressure limit. Referring to FIG. 1, the mechanical pressure relief system 10 includes a fitting 15 capable of being coupled to a pressurized fluid line (not shown) and a mechanical pressure relief valve 20 coupled to the fitting 15.

Figure 2:
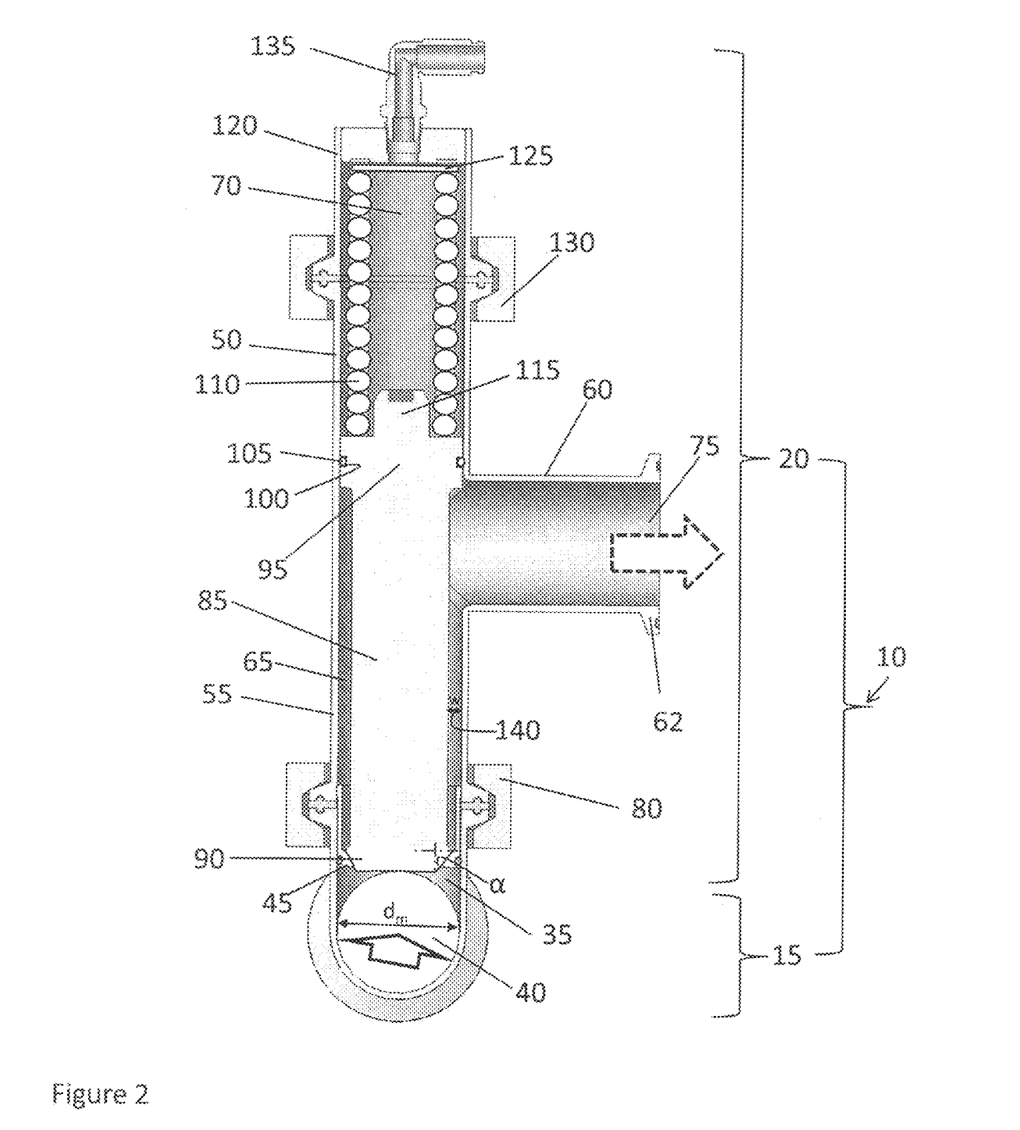
FIG. 2 is a cross-sectional view of the safety pressure relief system of FIG. 1 taken along axis (x) where the mechanical pressure relief valve is in its closed position.

The fitting 15 is defined by a first segment 25, a second segment 30, and a third segment 35. The first 25 and second 30 segments are coaxial to one another and define a main fluid passageway 40 that is sized to have a diameter ($d_m$) substantially similar to the inner diameter of the pressurized fluid line. One end of each of the first 25 and second 30 segments are capable of being inserted into the pressurized fluid line and coupled thereto such that all of the pressurized fluid that flows through the pressurized line also flows through the main fluid passageway 40. Referring now to FIGS. 1 and 2, the third segment 35 is perpendicular to the main fluid passageway 40 and includes a valve seat 45 defining an opening that is in communication with the fluid in the main fluid passageway 40.

Figure 3:
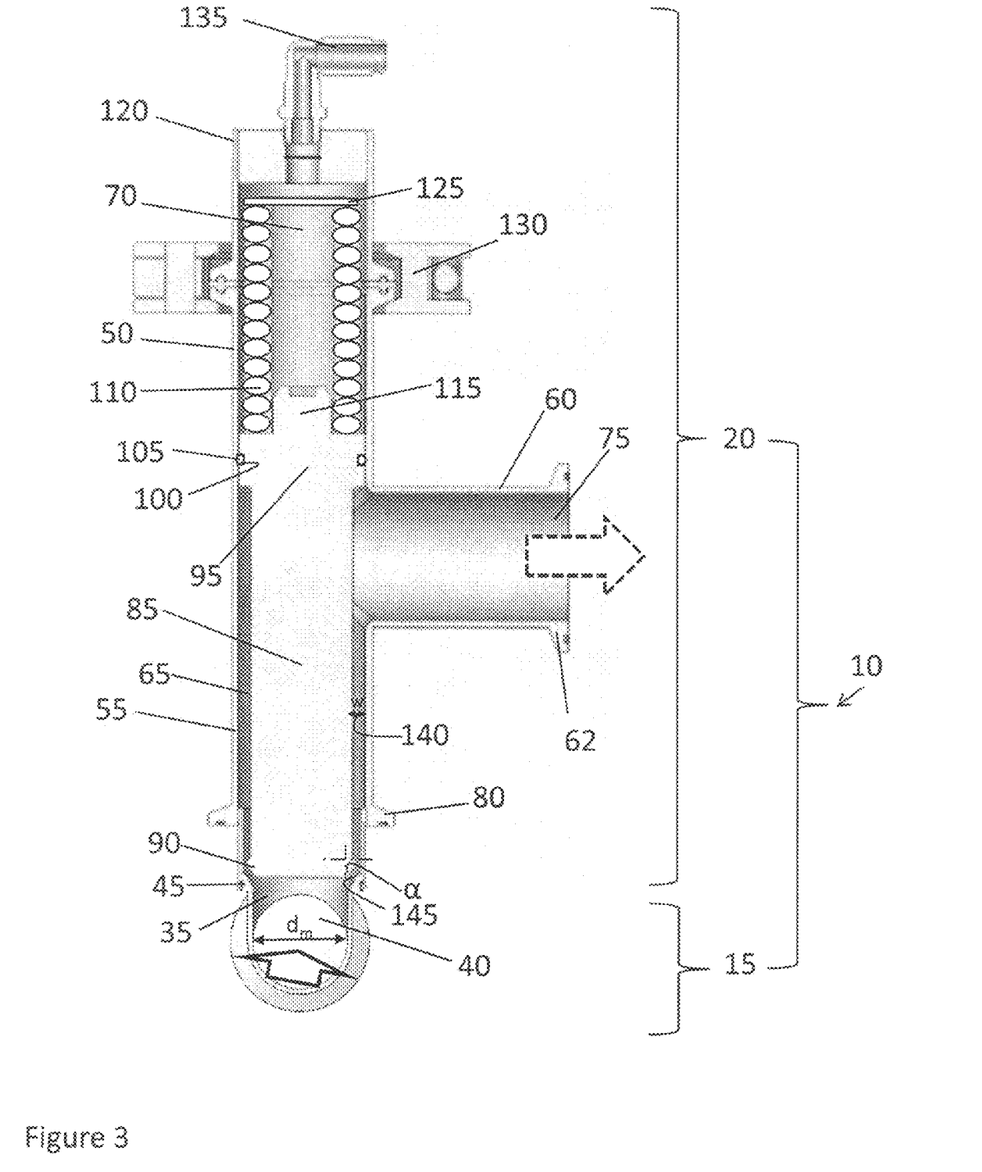
FIG. 3 is a cross-sectional view of the safety relief system of FIG. 1 taken along axis (x) where the mechanical pressure relief valve is in its open position.

Referring to FIGS. 1 to 3, the mechanical pressure relief valve 20 includes a housing having a top section 50, a bottom section 55, and a side section 60. The bottom section 55 defines a first passageway 65, while the top section 50 defines a second passageway 70 that is coaxially aligned with the first passageway 65. The side section 60 defines a third passageway 75. Each of the passageways 65, 70, 75 may be of the same or different diameter depending upon the desired application and performance characteristics. Preferably, the first passageway 65 and the second passageway 70 are substantially similar in diameter in order for the bottom section 55 and top section 50 to be made from a single cylindrical tube or body.

The fitting 15 is coupled to the mechanical pressure relief valve 20 through a first coupling 80. The first coupling 80 may include any means known to one skilled-in-the-art that establishes a flanged, threaded, or grooved connection with/without the use of an external clamp. The first coupling 80 is sized and adapted to withstand the pressure exerted by the pressurized fluid. A similar means of connecting a segment 25, 30 of the fitting 15 to the pressurized fluid line (not shown) may be utilized. Although the couplings are preferred to be reversible in that the fitting 15 and the pressure relief valve 20 may be removed from the pressurized line for cleaning or replacement, it is possible that one or more of the couplings be permanent, such as a coupling made by a welding process.

The mechanical pressure relief valve 20 further comprises a second coupling 62 that detachably connects the side section 60 of the pressure relief valve 20 to an overflow return line (not shown) The overflow return line returns fluid from the pressurized line to a vented fluid reservoir. This second coupling may utilize a similar means of connecting the side section 60 to the overflow return line as described above for the first coupling 80.

Referring again to FIGS. 2 and 3, the mechanical pressure relief valve 20 further comprises a valve stem 85 slidably located in its bottom section 65. The valve stem 85 includes a bottom end 90 that is shaped to match and mate with the valve seat 45 in the fitting 15. The bottom surface of the valve stem 85 is substantially flat and has a circumferential tapered edge defined by angle ($\alpha$). The angle ($\alpha$) is preferably between about 20 degrees and about 60 degrees. When the pressure relief valve 20 is in its closed position the bottom end 90 contacts the valve seat 45, thereby preventing any fluid from entering the first passageway 65 from the main fluid passageway 40. Alternatively, the bottom surface of the valve stem 70 may be formed into a round, ball-like shape.

The valve stem 85 includes a head 95 on its top end that is slidably located in the opening of the second passageway 70 of the top section 50. The head 95 includes a groove 100 around its circumference in which a compressible ring 105 resides. The compressible ring 105 is adapted to contact the inner surface of the top section 50 in the second passageway 70, thereby establishing a fluid tight seal between the head 95 and the inner surface of the top section 50.

Referring again to FIGS. 2 and 3, the pressure relief valve 20 further comprises a spring 110 located in the second passageway 70 and in contact with the head 95. The spring 110 is sized to provide a predetermined amount of resistance. The spring 110 may be placed around a shoulder 115 integrally formed with the head 95. The shoulder 115 may be used to assist one skilled-in-the-art in positioning the spring 110 on top of the head 95 during the assembly process for the pressure relief valve 20.

A spacer 125 is placed in contact with the spring 110 in the second passageway 70. The spacer 125 is sized to compress the spring 110 in order to establish a desired set pressure limit. The pressure limit it set when the spring exerts a downward force on the head 95 to force the relief valve 20 into its closed position (e.g., the bottom end 90 of the valve stem 85 contacts the valve seat 45). The relief valve 20 will remain closed until the fluid pressure in the pressurized line multiplied by the effective area of the bottom end 90 of the valve stem 85 exceeds the force exerted by the spring at the set pressure limit. The spacer 125 may be a single layer or comprised of more than one spacer layer stacked on top of each other.

The pressure limit may be set to a predetermined value predicted or desired for the pressure exerted by the fluid in the pressurized line or to a greater pressure value. Preferably, the pressure limit is set to a value greater than about 250 PSI, with about 300 PSI being preferred for use in a paint circulation and/or application system. The pressure limit is set by compressing the spring 110 with the spacer 125 until the spring 110 exerts a resistance equivalent to the desired pressure limit.

A cap 120 is placed over the second passageway 70 and allowed to contact the spacer 125. The cap 120 is coupled to the top section 70 through the use of a third coupling 130 in order to maintain the spring 110 in its compressed state. The third coupling 130 may be any means of coupling known to one skilled-in-the-art. The cap 120 optionally may comprise a vent and sight tube 135 to allow air to freely move into and out of the second passageway 70. When the seal between the head 95 and the inner surface of the second passageway 70 has failed, fluid is observed to flow through the vent and sight tube 135. By allowing air to flow back and forth through the vent & sight tube, air does not get compressed in the second passageway 70 of the top section 50, when the pressure relief valve 20 opens and the spring 110 gets further compressed to relieve the excess fluid pressure from the pressurized fluid line. The ability of venting the air in the second passageway 70 may be beneficial in reducing the occurrence of pulsation (i.e., chatter) and vibration when the valve 20 is cycled between its closed and open positions.

Referring now to FIG. 2, when the valve 20 is in its closed position, the bottom end 90 of the valve stem 85 is in close proximity to the inner surface of the main fluid passageway 40. However, the bottom end 90 of the valve stem 85 does not intrusively interfere with the flow of fluid through the pressurized line. Preferably, the relief valve 20 is designed such that the bottom end 90 of the valve stem 85 resides within less than about 3 mm (0.11 inches) from the inner surface of the main fluid passageway. The bottom end 90 of the valve stem 85 residing within close proximity to the interior surface of the pressurized paint line enhances the cleanliness of the valve 20.

When the pressure in the pressurized fluid line exceeds the set pressure limit, the fluid pressure forces the relief valve 20 into its open position as shown in FIG. 3 where the bottom end 90 of the valve stem 85 and the valve seat 45 separate and the valve stem 85 moves the head 95 further into the second passageway 70 to further compress the spring 110 against the spacer 125 and pressurized fluid is allowed to flow from the main fluid passageway 40 through the first 65 and third 75 passageways into the overflow line.

The valve stem 85 in the first passageway 65 forms a uniform channel 140 of radial width ($w_1$) with the inner surface of the bottom section 50 of the valve 20. When the valve 20 is in its full open position, the bottom surface 90 of the valve stem 85 and the valve seat 45 forms a radial gap 145 that is substantially the same in width as the width ($w_1$) of the uniform channel 140 established between the valve stem 85 and bottom section of the valve 20. The establishment of a uniform channel in the bottom section 55 of the pressure relief valve 20 with substantially the same fluid passage or clearance established between the valve seat 45 and the bottom surface 90 of the valve stem 85 has been unexpectedly found to reduce the occurrence of pulsation and vibration to almost zero when the valve 20 is cycled between its open and closed position. Although not wanting to be held to theory, it is possible that the establishment of a uniform channel maintains substantially smooth flow conditions or reduces the occurrence or magnitude of turbulent flow conditions.

The bottom section 55 and a top section 50 of the housing is sized to slidably receive the valve stem 85, while the side section 60 of the housing is sized to relieve the pressure from the pressurized line. The uniform passageway of width ($w_1$) as established between the valve stem 85 and the inside surface of the bottom section 55 include a channel established between the surface of the bottom end 90 of the valve stem 85 and the valve seat 45 and ends at the head 95 of the valve stem 85. The side section 60 is located proximate the head 95 of the valve stem 85 at the end of the uniform passageway.

Figures 4A, 4B:
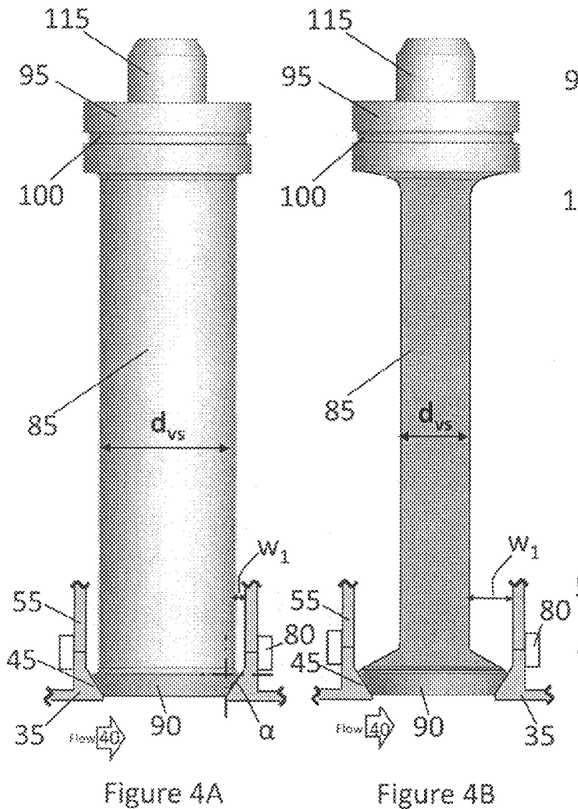
FIG. 4A is a perspective view of the valve stem used in the mechanical pressure relief valve according to one aspect of the present disclosure.
FIG. 4B is a perspective view of the valve stem used in the mechanical pressure relief valve according to another aspect of the present disclosure.
Figure 4C:
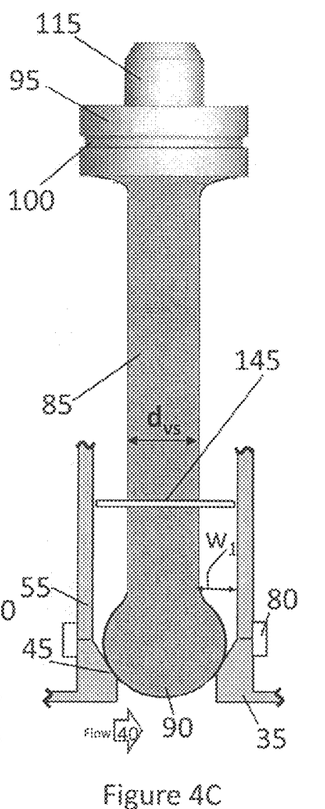
FIG. 4C is a perspective view of the valve stem used in the mechanical pressure relief valve according to yet another aspect of the present disclosure.

Referring now to FIGS. 4A-4C, the valve stem 85 may be designed to have a diameter ($d_{vs}$) that is smaller than the diameter of the first passageway 65 in the bottom section 55 of the housing. Thus a radial gap or channel with width, $w_1$, is established between the valve stem 85 and the inner surface of the bottom section 55. Preferably, the radial gap between the valve stem 85 and the bottom section 55 is uniform throughout the entire bottom section 55. The width ($w_1$) of the radial gap may be between about 0.5 mm to about 10 mm.

The bottom surface 90 of the valve stem 85 may be flat or curved to match the inner surface of the first segment 25 and second segment 30 that define the main fluid passageway 40. Alternatively, the bottom surface 90 may be ball-shaped as shown in FIG. 4C. The bottom surface 90 further comprises an angled portion that is adapted to match and mate with the valve seat 45 in the third segment 35 of the fitting 15. The relief valve 20 is designed such that when the angled portion of the bottom surface 90 and the valve seat 45 are in contact with one another, the distance between the bottom surface 90 and the main fluid passageway 40 is within the range of about 0 mm to 3 mm.

The lack of any substantial cavity between the main fluid passageway 40 and the bottom surface 90 of the valve stem 85 reduces the potential of any disruption (e.g., eddy currents) in the flow path of the pressurized fluid, as well as the possibility of any particle agglomeration occurring from stagnated fluid becoming trapped in such a passageway. Particle agglomeration is undesirable since it can lead to separation of the particles from the pressurized fluid, thereby, resulting in a solid sediment that can affect the performance and lifetime of the pressure relief valve. In particular applications, such as the circulation and application of paint to the surface of a product, the occurrence of sedimentation in the pressurized paint circulation line is known to be a cause of point defects observable in the applied paint finish.

Figure 5:
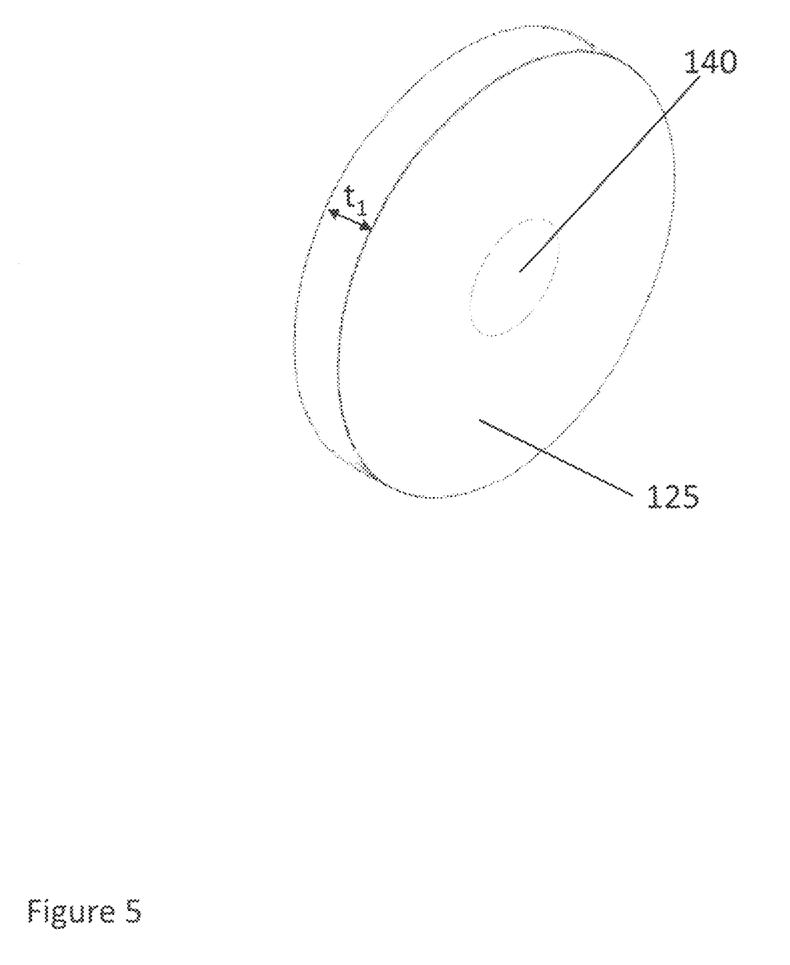
FIG. 5 is a perspective view of the spacer used in the mechanical pressure relief valve according to the teachings of the present disclosure.

Referring now to FIG. 5, the spacer 125 may be defined as a disc of thickness ($t_1$) having at least one orifice 140 through the spacer 125. The orifice 140 allows for the reversible passage of air between the second passageway 70 in the top section 50 of the pressure relief valve 20 and the vent and sight tube 135. The thickness ($t_1$) of the spacer 125 is determined by the specific volume necessary for the disc to occupy in order to compress the spring 110 to the extent that it will provide a resistance equivalent to the desired pressure set point or limit. More than one spacer can be utilized where the sum of the thicknesses for each spacer is used as the measure of the overall thickness ($t_1$).

The pressure relief valve 20 and fitting 15 may be made out of any material known to one skilled-in-the-art that will withstand exposure to the pressurized fluid. Preferably, the bottom section 55, the valve seat 45, the valve stem 85, the head 95, the top section 50, and the side section 60 of the pressure relief valve 15, as well as the fitting 15 are constructed of stainless steel.

The following specific examples are given to illustrate the disclosure and should not be construed to limit the scope of the disclosure. Pressure relief valves (I-IV) were constructed according to the teachings of the present disclosure with the only difference being the geometry selected for the valve stem 85. The valves stems for each pressure relief valve (I-IV) are summarized in Table 1. A conventional valve (v) was used as a control for comparison.

The term center support 145 describes either a pin or a disc radially projecting from the valve stem 85 towards the inner wall of the bottom section 55. A center support 145 may be optionally incorporated as part of the valve stem 85 in order to assist in maintaining the location of the valve stem 85 proximate to the center of the bottom section 55 when the valve 20 is open and the width ($w_1$) is greater than about 3 mm. An example of the optional center support 145 is shown in FIG. 4C.

TABLE 1

| | Type of Valve Stem (85) |
|---|---|
| I | Flat bottom, 30° taper, $W_1$ < 3 mm |
| II | Flat bottom, 30° taper, $W_1$ > 3 mm |
| III | Rounded bottom, $W_1$ > 3 mm |
| IV | Rounded bottom, $W_1$ > 3 mm with a center support |
| V | Conventional Valve |

The spring utilized was 3" in length with a wire size of 0.204"×0.244" providing a maximum load of 532.8 lbs with a maximum of 15% deflection occurring at maximum load. The spring was compressed by a spacer with a thickness ($t_1$) of 2.3 mm (0.090") to set the pressure limit at 300 PSI. Each pressure relief valve system utilized a 1.5" outlet coupled to an overflow line. Each pressure relief valve system was then attached to a pressurized circulation system equipped with a fluid line connecting a piston pump, a back pressure regulator, and a fluid reservoir. The fluid in the circulation system was allowed to flow through the pressurized line at 275 PSI. The fluid was an oil with a viscosity on the order of about 75 centipoise. All five pressure relief valve systems (I-V) were observed to be essentially leak-free after the fluid was allowed to circulate through the pressurized line for about 30 minutes at a pressure of 275 PSI.

The pressure in the circulation system was then increased to above the set pressure limit and the flow of fluid was observed to occur through the pressure relief valves and overflow line to the vented fluid reservoir. All five of the valves were observed to relieve the pressure in the circulation system when the pressure in the system exceeded the 300 PSI limit. The amount of pulsation (e.g., chatter) and vibration induced by each of the pressure relief valve systems (I-V) was monitored while the valve was allowed to open and close. Very little pulsation and vibration was observed for all of the valves (I-IV) prepared according to the teachings of the present disclosure when compared against the chatter observed to be induced by the conventional pressure relief valve (V). The magnitude in pulsation and vibration for the various pressure relief valves was observed to increase in the order I<IV<II~III<<V.

Figure 6:
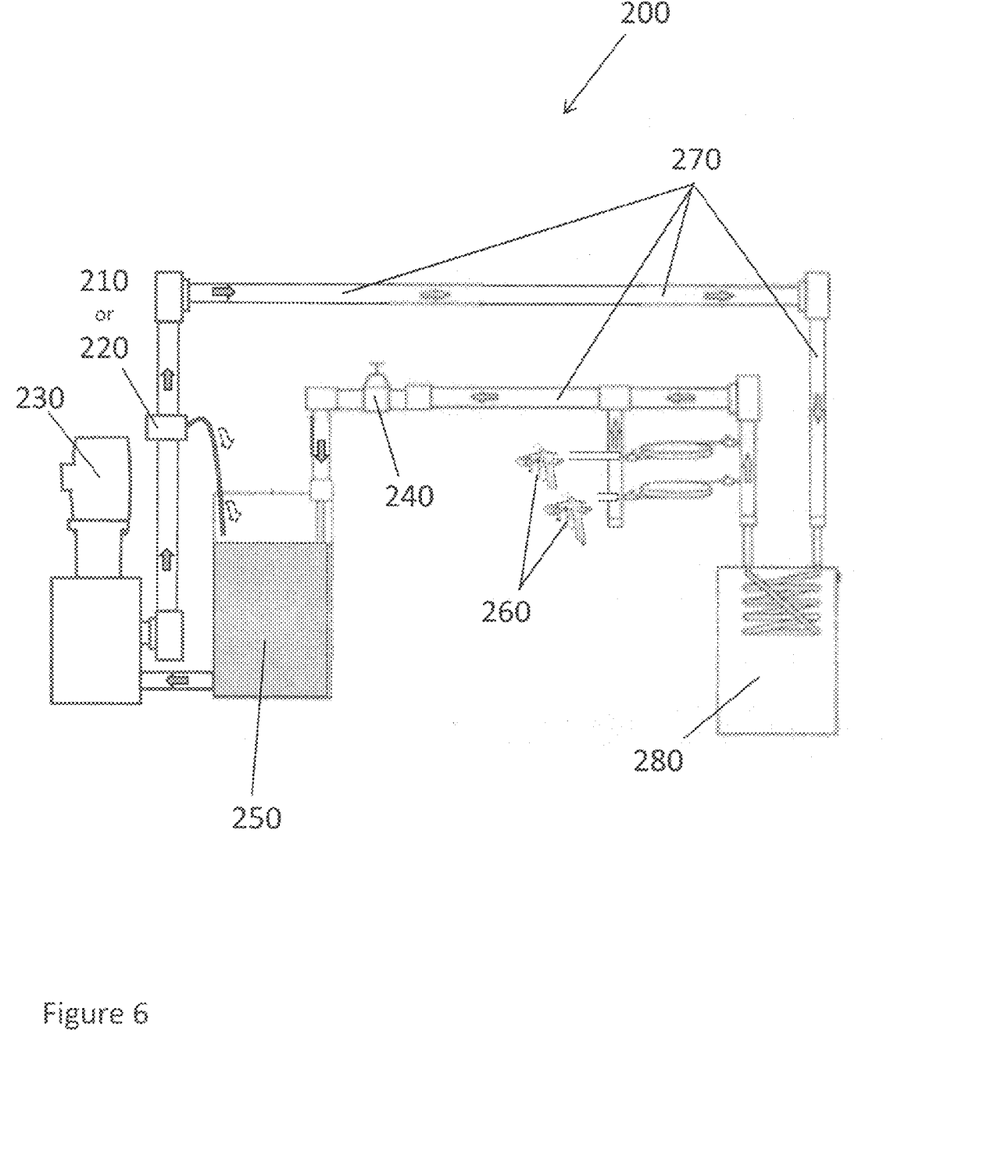
FIG. 6 is a schematic representation of a paint circulation and application system incorporating the pressure relief valve or system of FIGS. 1-3.

Another objective of the present disclosure is to provide a pressurized paint line that incorporates a pressure relief valve system 10 constructed according to the teachings of the present disclosure. A pressurized paint line is generally used to circulate and apply paint to the surface of a manufactured part. Referring to FIG. 6, the pressurized paint line 200 comprises a pump 230 to pressurize the system and to cause the paint to flow; a back pressure regulator 240; a mix tank 250 acting as a vented reservoir of paint to feed the pump 230; an applicator 260 for applying the paint to the surface of the manufactured part; a series of pipes 270 coupled to the individual components in such a manner as to allow the paint to be circulated and applied to the part; the pressure relief valve system 210 or the pressure relief valve 220 constructed according the teachings of the present disclosure; and a means 280 of controlling the temperature of the paint flowing through the pipes, such as through the use of a condenser or the like.

The pressure relief valve has an open and closed position, where the open position allows a portion of the paint flowing through the pipes to be diverted back to the mix tank when the pressure in the pipes exceeds a predetermined pressure limit. The use of this pressure relief valve in the pressurized paint line reduces the occurrence of pulsation and vibration when the valve is cycled between its open and closed positions. A person skilled-in-the-art will understand that other components may be added to the pressurized paint line, such as flow meters, low shear mixers or agitators, and in-line viscometers, among others, without exceeding the scope of the present disclosure. In addition, any components or equipment known to be used in a pressurized paint line, including but not limited to pressure pots, reinforced tubing, spray guns, lobe pumps, piston pumps, and diaphragm pumps, may be substituted for the components described above and may be used in the pressurized paint line described in the present disclosure.

A person skilled in the art will recognize that the measurements described are standard measurements that can be obtained by a variety of different test methods. The test methods described in the examples represents only one available method to obtain each of the required measurements.

The foregoing description of various embodiments of the disclosure has been presented for purposes of illustration and description. It is not intended to be exhaustive or to limit the disclosure to the precise embodiments disclosed. Numerous modifications or variations are possible in light of the above teachings. The embodiments discussed were chosen and described to provide the best illustration of the principles of the disclosure and its practical application to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A mechanical pressure relief system that allows at least a portion of the fluid flowing through a pressurized fluid line to flow back to a vented fluid reservoir through an overflow line when the pressure in the pressurized fluid line exceeds a predetermined pressure limit; the pressure relief valve system comprising: a fitting having a first segment, a second segment, and a third segment; the third segment locating between the first and second segments; the first and second segments being coaxial to one another and defining a main fluid passageway; the first and second segments capable of being inserted into the pressurized fluid line and coupled thereto such that the fluid flowing through the pressurized line flows through the main fluid passageway; the third segment intersecting with the main fluid passageway and having a valve seat that defines an opening in communication with the fluid in the main fluid passageway; a housing having a bottom section defining a first passageway, a top section defining a second passageway, and a side section defining a third passageway; the bottom section being detachably connected to the third segment of the fitting; the side section being detachably connected to the overflow line for returning fluid from the pressurized line to the vented fluid reservoir; a valve stem having a bottom end and a top end; the valve stem slidably extending through the first passageway into the second passageway; the bottom end having a surface that is shaped to match and mate with the valve seat; the top end including a head with a groove circumferentially located therein; the head sized to slidably fit into the second passageway; a compressible ring located in the groove of the head; the compressible ring adapted to contact the inner surface of the second passageway, thereby establishing a fluid tight seal between the head and the surface of the second passageway; a spring located in the second passageway and in contact with the head; the spring sized to provide a predetermined amount of resistance; the spring being compressed in order to establish a desired set pressure limit, thereby, forcing the bottom end of the valve stem to contact the valve seat causing the relief valve to be in its closed position; a cap placed over the second passageway and coupled thereto in order to maintain the spring in its compressed state; and wherein when the valve is in a closed position, the bottom end of the valve stem is in close proximity to the inner surface of the main fluid passageway, but does not intrusively interfere with the flow of fluid through the main fluid passageway; wherein when the pressure in the pressurized fluid line exceeds the set pressure limit, the fluid pressure forces the relief valve into an open position where the bottom end of the valve stem and the valve seat separate and the valve stem moves the head further into the second passageway to further compress the spring; and pressurized fluid is allowed to flow from the main fluid passageway through the first and third passageways into the overflow line; wherein a radial gap is established between the surface of the bottom end of the valve stem and the valve seat and a uniform channel through which fluid flows is established between the inner surface of the first passageway and the entire portion of the valve stem having a diameter ($d_{vs}$) located between the bottom end and the head of the valve stem, such that the radial gap and the uniform channel have substantially the same radial width ($W_1$) through which the fluid flows when the relief valve is in its open position.

2. The pressure relief system of claim 1, wherein the main fluid passageway is sized to have a diameter that is substantially the same as the inner diameter of the pressurized fluid line.

3. The pressure relief system of claim 1, wherein the third segment is perpendicular to the main fluid passageway.

4. The pressure relief system of claim 1, wherein the cap further comprises a vent and sight tube to allow air to freely move into and out of the second passageway and to allow fluid to flow out of the second passageway when the seal between the head and the inner surface of the second passageway fails.

5. The pressure relief system of claim 1, wherein the bottom surface of the valve stem is substantially flat and has a circumferential tapered edge defined by angle (a) that is between about 20 degrees and about 60 degrees.

6. The pressure relief system of claim 1, wherein the bottom surface of the valve stem is formed into a round, ball-like shape.

7. The pressure relief system of claim 1, wherein the bottom section, the valve seat, the valve stem, the head, the top section, and the side section are constructed of stainless steel.

8. The pressure relief system of claim 1, further comprising a spacer in contact with the spring in the second passageway; the spacer being sized to compress the spring and is made from one selected from the group of a single layer and more than one layer stacked on top of each other.

9. The pressure relief system of claim 1, wherein the set pressure limit is greater than about 250 PSI.

10. The pressure relief system of claim 9, wherein the set pressure limit is about 300 PSI.

11. The pressure relief system of claim 10, wherein when the pressure relief valve is in its closed position; the bottom of the valve stem resides within less than about 3 mm from the inner surface of the main fluid passageway.

* * * * *